United States Patent Office

3,000,950
Patented Sept. 19, 1961

3,000,950
ALIPHATIC NITRAZA POLYNITRO DIAMINES

Milton B. Frankel, Pasadena, and Karl Klager, Monrovia, Calif., assignors to Aerojet-General Corporation, Azusa, Calif., a corporation of Ohio
No Drawing. Filed Mar. 4, 1957, Ser. No. 643,893
17 Claims. (Cl. 260—583)

This invention relates to new compositions of matter useful as high explosives, and a method for their preparation. In particular, this invention relates to secondary diamines having the general formula:

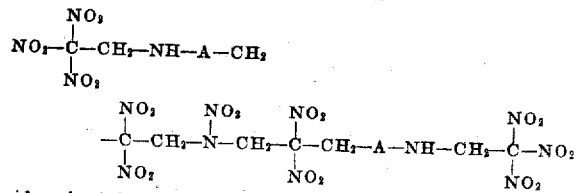

wherein A is an alkylene radical.

This application is a continuation-in-part of our copending United States patent application Serial No. 451,705, filed August 23, 1954, now abandoned.

These compounds are prepared by condensing a primary diamine with 2,2,2-trinitroethanol in accordance with the general reaction scheme set forth below:

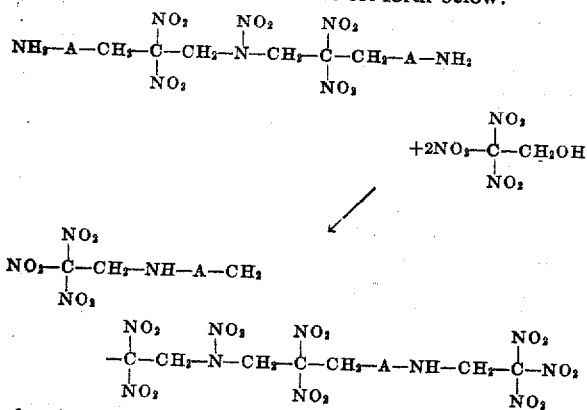

wherein A is an alkylene radical.

Due to the degrading effect of strong alkali upon the trinitromethyl groups, it is preferred to conduct the condensation at a pH of below 8, preferably from about 4 to 8. As the nitraza diamines are also somewhat unstable free bases, we prefer to introduce the diamines into the reaction mixture as salts. Optimum results are obtained when the diamine is added to the condensation mixture as a readily hydrolyzable organic salt. Another equally suitable method is to generate the diamine from a mineral acid salt in situ by introducing a hydroxide or organic salt of an alkali or alkaline earth metal.

To more clearly illustrate this invention, the following example is presented. It is to be understood, however, that this example is presented merely as a means of illustration and is not intended to limit the scope of the invention in any way.

EXAMPLE I

*Preparation of 1,1,1,6,6,8,10,10,15,15,15-undecanitro-3,8,13-triaza pentadecane*

In a flask fitted with a mechanical stirrer and dropping funnel was placed a suspension of 9.1 gm. (0.018 mole) of 3,3,5,7,7-pentanitro-5-aza-1,9-nonane diammonium dinitrate in 19 ml. of distilled water. On warming to 48° C. a clear colorless solution was obtained which after 15 minutes turned a light yellow. To this solution was added 6.46 gm. (0.036 mole) of 2,2,2-trinitroethanol followed by the dropwise addition of a solution of 1.34 gm. (0.036 mole) sodium hydroxide in 10 ml. of water. After the addition was completed the solution was stirred for 30 minutes and then allowed to stand overnight while being chilled, whereupon a yellow solid separated from the solution. The product was found to have a M.P. of 90–105° C. with decomposition, slightly soluble in water and readily soluble in acetone.

We have also found that amines such as 4,4,6,8,8-pentanitro-6-aza-1,11-undecane diamine, 5,5,7,9,9-pentanitro-7-aza-1,13-tridecane diamine and 6,6,8,10,10-pentanitro-8-aza-1,15-pentadecane diamine, condense with 2,2,2-trinitroethanol to produce other valuable explosives, namely, 1,1,1,7,7,9,11,11,17,17,17-undecanitro-3,9,15-triaza heptadecane, 1,1,1,8,8,10,12,12,19,19,19-undecanitro-3,10,17-triaza nonadecane, and 1,1,1,9,9,11,13,13,21,21,21-undecanitro-3,11,19-triaza hemeicosane.

From this it is apparent that any secondary diamine of this series can be prepared by merely condensing an appropriate diamine with 2,2,2-trinitroethanol, in accordance with the teachings of this invention.

The new compositions of our invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

We claim:

1. As compositions of matter, the secondary diamines having the formula:

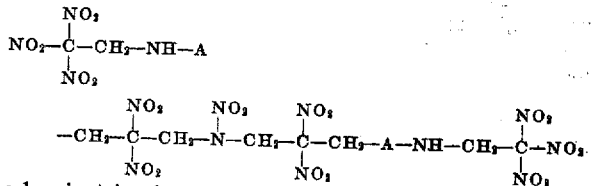

wherein A is a lower alkylene radical.

2. As a composition of matter, 1,1,1,6,6,8,10,10,15,15,15-undecanitro-3,8,13-triaza pentadecane having the structural formula:

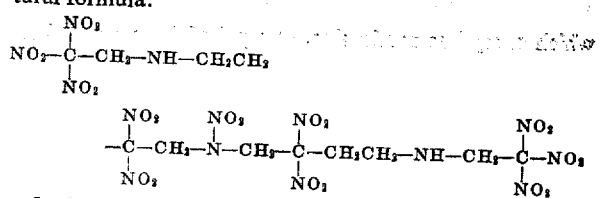

3. As a composition of matter, 1,1,1,7,7,9,11,11,17,17,17-undecanitro-3,9,15-triaza heptadecane having the structural formula:

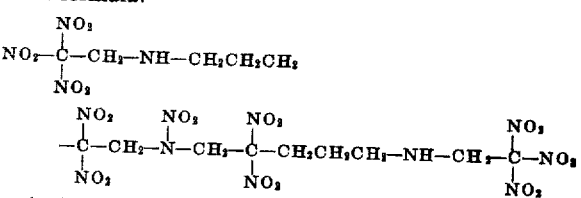

4. As a composition of matter, 1,1,1,8,8,10,12,12,19,19, 19-undecanitro-3,10,17-triaza nonadecane having the structural formula:

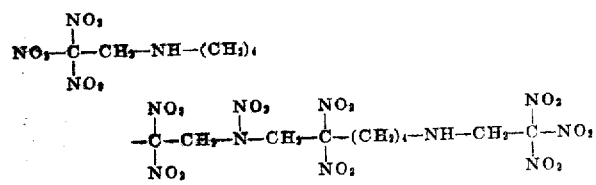

5. As a composition of matter, 1,1,1,9,9,11,13,13,21,21,21-undecanitro-3,11,19-triaza hemeicosane having the structural formula:

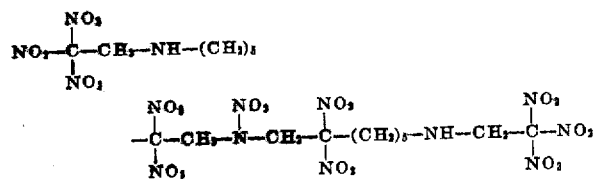

6. The method of preparing secondary diamines having the formula:

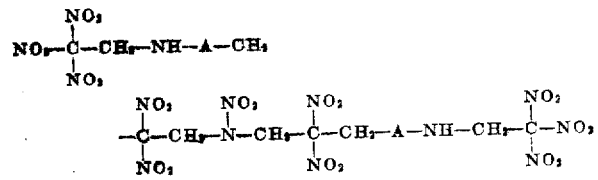

which comprises condensing 2,2,2-trinitroethanol with a diamine having the formula:

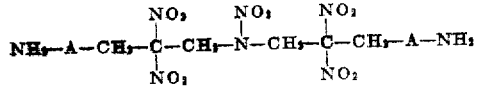

wherein A is a lower alkylene radical.

7. The method of preparing 1,1,1,6,6,8,10,10,15,15,15-undecanitro-3,8,13-triaza pentadecane which comprises condensing 3,3,5,7,7-pentanitro-5-aza-1,9-nonane diamine with 2,2,2-trinitroethanol.

8. The method of preparing secondary diamines having the formula:

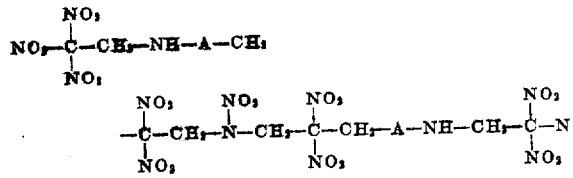

which comprises condensing, at a pH of from about 4 to about 8, 2,2,2-trinitroethanol with a diamine having the formula:

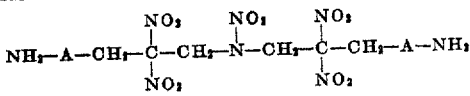

wherein A is a lower alkylene radical.

9. The method of preparing secondary diamines having the formula:

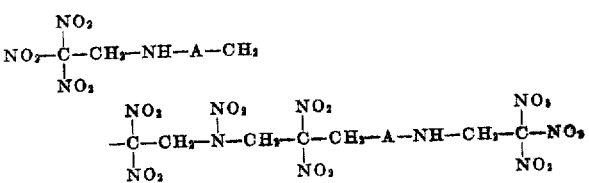

which comprises condensing 2,2,2-trinitroethanol with a diamine having the formula:

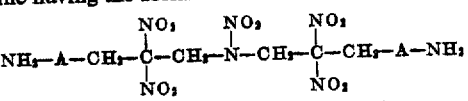

wherein A is a lower alkylene radical, said diamine being generated in the reaction mixture from its mineral acid salt by the introduction of a base selected from a group consisting of the hydroxides of the alkali and alkaline earth metals.

10. The method of preparing 1,1,1,6,6,8,10,10,15,15,15-undecanitro-3,8,13-triaza pentadecane which comprises condensing 3,3,5,7,7-pentanitro-5-aza-1,9-nonane diamine with 2,2,2-trinitroethanol, said diamine being generated in the reaction mixture from 3,3,5,7,7-pentanitro-5-aza-1,9-nonane diammonium dinitrate by the introduction of sodium hydroxide.

11. The method of claim 6 wherein the reaction is conducted at a pH below about 8.

12. The method of claim 6 wherein the reaction is conducted at a temperature of about 48° C.

13. The method of claim 8 wherein the reaction is conducted at a temperature of about 48° C.

14. The method of claim 9 wherein the reaction is conducted at a pH below about 8.

15. The method of preparing 1,1,1,7,7,9,11,11,17,17,17-undecanitro-3,9,15-triaza heptadecane which comprises condensing 4,4,6,8,8-pentanitro-6-aza-1,11-undecane diamine with 2,2,2-trinitroethanol.

16. The method of preparing 1,1,1,8,8,10,12,12,19,19,19-undecanitro-3,10,17-triaza nonadecane which comprises condensing 5,5,7,9,9-pentanitro-7-aza-1,13-tridecane diamine with 2,2,2-trinitroethanol.

17. The method of preparing 1,1,1,9,9,11,13,13,21,21,21-undecanitro-3,11,19-triaza hemeicosane which comprises condensing 6,6,8,10,10-pentanitro-8-aza-1,15-pentadecane diamine with 2,2,2-trinitroethanol.

No references cited.